UNITED STATES PATENT OFFICE.

GUSTAF GRÖNDAL, OF DJURSHOLM, SWEDEN, ASSIGNOR TO A/S. NORSK STAAL, OF TRONDHJEM, NORWAY.

MANUFACTURE OF IRON SPONGE.

1,322,430.   Specification of Letters Patent.   Patented Nov. 18, 1919.

No Drawing.   Application filed January 22, 1918.   Serial No. 213,246.

*To all whom it may concern:*

Be it known that I, GUSTAF GRÖNDAL, a subject of the King of Sweden, residing at Djursholm, Sweden, have invented certain new and useful Improvements in the Manufacture of Iron Sponge; and I do hereby declare the following to be a full, clear, and exact description of the invention, such as will enable others skilled in the art to which it appertains to make and use the same.

This invention relates to the manufacture of iron sponge by the reduction of iron ore and has for its object a method of treating the obtained product so as to prevent its oxidation.

In the manufacture of the product known as "iron sponge" by the reduction of iron ore it is difficult to effect the cooling of the product in an efficient manner and to prevent it from being oxidized.

To avoid these difficulties the iron sponge has for instance been introduced into gas-tight vessels where it has been left until cooled or the sponge has been passed over cooled surfaces whereby it has been cooled down before it is subjected to the action of the air. These known processes are however both connected with great drawbacks. Thus according to the firstnamed process the cooling takes place very slowly through the mass, which during the treatment will coalesce into a quite solid mass. According to the other method the cooling will be efficient only when the product is in a finely divided state. This however is usually not the case because a formation of lumps during the reaction could hardly be avoided.

The present invention now has for its object a simple and efficient method of treating the reduced ore for the purpose of cooling the same and according to which it is of no consequence whether the product is in a finely divided condition or in the form of lumps.

The invention is based upon the observation that iron sponge in a hot condition is not oxidized when plunged into water from which certain substances such as carbonic acid and bicarbonates contained in ordinary water have been removed or neutralized respectively.

According to this invention the hot product of reduction is introduced into water which previously has been subjected to a boiling process and cooled or to which has been added an alkaline substance such as milk of lime or the like. The desired result may, for instance, be attained by the use of water containing about 0.15 per cent. of $Ca(OH)_2$. The iron sponge is preferably introduced into the water directly from the reduction furnace and at the reduction temperature. Special care must be taken that the water is kept at a comparatively low temperature for instance about 20° C. It has been found that satisfactory results are obtained even when the temperature of the water rises to about 30 and 40° C. after quenching, but it is preferred to maintain a somewhat lower temperature.

Claims:

1. In the manufacture of iron sponge by the reduction of iron ore the method which consists in introducing the hot iron sponge obtained by the reduction process into water which has been previously treated in such manner as to remove free carbonic acid from the same.

2. The process which consists in introducing hot iron sponge into water previously boiled.

3. The method of preventing the oxidation of iron sponge, which comprises introducing the sponge while hot into water containing no free carbonic acid.

4. In the manufacture of iron sponge by the reduction of iron ore the method which consists in introducing the hot iron sponge obtained by the reduction process into water which has been previously treated in such manner as to remove free carbonic acid from the same, the quantity and temperature of the water being controlled in such manner that the temperature of the water is maintained below 50° C.

In testimony that I claim the foregoing as my invention, I have signed my name in presence of two subscribing witnesses.

GUSTAF GRÖNDAL.

Witnesses:
V. HOHNOTOR,
L. LENMARTERON.